US00RE47147E

(19) United States
(12) Reissued Patent
Otsubo

(10) Patent Number: US RE47,147 E
(45) Date of Reissued Patent: Nov. 27, 2018

(54) ESD PROTECTION DEVICE AND METHOD FOR PRODUCING THE SAME

(71) Applicant: Murata Manufacturing Co., Ltd., Kyoto (JP)

(72) Inventor: Yoshihito Otsubo, Kyoto (JP)

(73) Assignee: MURATA MANUFACTURING CO., LTD., Kyoto (JP)

(21) Appl. No.: 15/286,750

(22) Filed: Oct. 6, 2016

Related U.S. Patent Documents

Reissue of:

(64) Patent No.: 9,398,673
Issued: Jul. 19, 2016
Appl. No.: 13/923,734
Filed: Jun. 21, 2013

U.S. Applications:

(63) Continuation of application No. PCT/JP2011/079174, filed on Dec. 16, 2011.

(30) Foreign Application Priority Data

Dec. 27, 2010 (JP) ..... 2010-290276

(51) Int. Cl.
*H01T 4/08* (2006.01)
*H05F 3/04* (2006.01)
*H01T 4/12* (2006.01)

(52) U.S. Cl.
CPC ..... *H05F 3/04* (2013.01); *H01T 4/12* (2013.01)

(58) Field of Classification Search
CPC ..... H05F 3/04; H01T 4/12; H02H 9/00
(Continued)

(56) References Cited

U.S. PATENT DOCUMENTS 8,426,889 B2 * 4/2013 Adachi ..... H01T 4/12 257/173
2009/0067113 A1 3/2009 Urakawa
2010/0309595 A1 * 12/2010 Adachi ..... H01T 1/20 361/56

FOREIGN PATENT DOCUMENTS

CN 101542856 A 9/2009
JP 60-109290 U 7/1985
(Continued)

OTHER PUBLICATIONS

Song Junyin, Shanghai Patent and Trademark Office, LLC., Notice of First Office Action, Application/Patent No. 201180062464.X, Issued Jun. 4, 2014.

(Continued)

*Primary Examiner* — Kenneth J Whittington

(74) *Attorney, Agent, or Firm* — Pearne & Gordon LLP

(57) ABSTRACT

An ESD protection device is provided which experiences only small increases in discharge start voltage and discharge protection voltage and relatively free of scorching or peeling at the ends of the discharge electrodes thereof even if a discharge repeatedly occurs. The ESD protection device has an insulating substrate with a cavity, and in the cavity first and second discharge electrodes are so disposed that the ends thereof face each other with a gap therebetween. A first outer electrode is on the outer surface of the insulating substrate and electrically connected to the first discharge electrode, and a second outer electrode is on the outer surface of the insulating substrate and electrically connected to the second discharge electrode. The ends of the first and second discharge electrodes are thicker than any other portion of the first and second discharge electrodes.

13 Claims, 3 Drawing Sheets

(58) Field of Classification Search
USPC ..... 361/54, 55, 56, 57, 112
See application file for complete search history.

(56) References Cited

FOREIGN PATENT DOCUMENTS

| | | | | |
|---|---|---|---|---|
| JP | S60-10920 | U | | 7/1985 |
| JP | 09-199259 | A | | 7/1997 |
| JP | 09-306635 | A | | 11/1997 |
| JP | 2003-217788 | A | | 7/2003 |
| JP | 2007-48759 | A | | 2/2007 |
| WO | 2008/146514 | A1 | | 12/2008 |
| WO | 2010/061550 | A1 | | 6/2010 |
| WO | 2010/067503 | A1 | | 6/2010 |
| WO | WO2010061550 | | * | 6/2010 |

OTHER PUBLICATIONS

International Search Report for PCT/JP2011/079174 dated Mar. 19, 2012.
Written Opinion of the International Searching Authority for PCT/JP2011/079174 dated Mar. 19, 2012.

* cited by examiner (a)

(b)

ESD PROTECTION DEVICE AND METHOD FOR PRODUCING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to an ESD protection device for protection from static electricity and a method for producing this device and more specifically to an ESD protection device having a structure in which a pair of discharge electrodes face each other in a cavity formed in an insulating substrate and a method for producing this device.

BACKGROUND ART

Hitherto researchers have proposed various ESD protection devices for protecting electronic devices from electrostatic discharge, or ESD.

For example, Patent Document 1 discloses an ESD protection device having an insulating substrate and first and second discharge electrodes arranged therein. The ESD protection device disclosed in Patent Document 1 has a cavity in the insulating substrate. In this cavity the first and second discharge electrodes are exposed and the ends thereof face each other. The first discharge electrode extends out of either end face of the insulating substrate. An outer electrode is on each of the pair of end faces of the insulating substrate. This ESD protection device also has a mixing portion in the area where the first and second discharge electrodes face each other, and the mixing portion is on the lower surface side of the first and second discharge electrodes and reaches the first and second discharge electrodes. The discharge aid portion contains metal particles and ceramic particles, and the metal particles and the ceramic particles are dispersed in an insulating material in the insulating substrate.

In the ESD protection device according to Patent Document 1, the shrinkage of the ceramic material contained in the insulating substrate and the first and second discharge electrodes on firing and the difference in the coefficient of the thermal expansion between these materials after the shrinkage are reduced due to the presence of the mixing portion. This ensures high precision in discharge start voltage, according to the publication.

CITATION LIST

Patent Document

Patent Document 1: WO 2008/146514 A1

SUMMARY OF INVENTION

Technical Problem

When an electrostatic charge is applied to an ESD protection device, a discharge occurs between the first and second discharge electrodes thereof. Repeated application of this electrostatic charge and repeated discharges cause the ends of the discharge electrodes to be melted by the heat generated during the discharges. As the ends of the discharge electrodes are melted, the size of the gap between the first and second discharge electrodes becomes larger, thereby increasing the discharge start voltage and, therefore, the discharge protection voltage. This ESD protection device may no longer be reliable in protecting electronic devices from static electricity.

An object of the present invention is to provide an ESD protection device unlikely to experience an increase in the size of the discharge gap therein and, therefore, an increase in discharge start voltage even when an electrostatic charge is repeatedly applied thereto.

Solution to Problem

An ESD protection device according to the present invention has an insulating substrate with a cavity, first and second discharge electrodes, and first and second outer electrodes on an outer surface of the insulating substrate. Ends of the first and second discharge electrodes face each other with a gap therebetween in the cavity of the insulating substrate. The first outer electrode is electrically connected to the first discharge electrode, and the second outer electrode is electrically connected to the second discharge electrode. In the ESD protection device according to the present invention, the ends of the first and second discharge electrodes are thicker than any other portion of the first and second discharge electrodes.

In a particular aspect of the ESD protection device according to the present invention, the insulating substrate is a ceramic multilayer substrate obtained by firing a stack of a plurality of ceramic greensheets. This allows the ESD protection device according to the present invention to be obtained using known techniques for co-firing ceramic articles.

In another particular aspect of the ESD protection device according to the present invention, a height of a lowest portion of a ceiling of the cavity is shorter than a thickness of thickest portions of the first and second discharge electrodes at the ends thereof when a direction of a thickness of the first and second discharge electrodes is defined as a direction of a height of the cavity. This makes aerial discharges more likely to occur, thereby leading to enhanced ESD protection characteristics.

In yet another particular aspect of the ESD protection device according to the present invention, the ends of the first and second discharge electrodes have an end face that is straight when viewed from a cross-section including a direction where the ends face each other and the direction of the thickness of the first and second discharge electrodes. This reduces variations in discharge start voltage.

Still another particular aspect of the ESD protection device according to the present invention has a discharge aid portion. The discharge aid portion reaches the first and second discharge electrodes in an area where the first and second discharge electrodes face each other with the gap therebetween and contains metal particles and semiconductor particles. This leads to a reduced discharge start voltage as a result of the discharge aid portion being formed.

A different particular aspect of the ESD protection device according to the present invention has a sealing layer between the discharge aid portion and the insulating substrate. This provides protection for the cavity portion, keeping the inside of the cavity free of foreign substances such as the glass component dispersed in another material in the insulating substrate, the discharge aid portion, and other elements, thereby slowing down the damage to the insulation between the discharge electrodes caused by penetration by the glass component.

A method for producing an ESD protection device according to the present invention includes preparing a plurality of ceramic greensheets, forming first and second discharge electrodes on at least one of the ceramic greensheets so that the discharge electrodes are thicker at ends thereof than in any other portion, placing plain ones of the ceramic greensheets on and under the one carrying the first and second discharge electrodes to make a laminate, firing the laminate to make an insulating substrate with a cavity in which the ends of the first and second discharge electrodes face each other, and forming first and second outer electrodes electrically connected to the first and second discharge electrodes, respectively. The term "plain ones of the ceramic greensheets" means ceramic greensheets having surfaces which are not subjected to any processing.

In a particular aspect of the method for producing an ESD protection device according to the present invention, forming the first and second discharge electrodes on the at least one of the ceramic greensheets further includes, before forming the first and second discharge electrodes or after forming the first and second discharge electrodes, supplying a cavity-forming material that turns into a gas when fired. This allows the cavity to be formed by the gas generated from the cavity-forming material while the ceramic material is fired.

In another particular aspect of the method for producing an ESD protection device according to the present invention, the cavity-forming material is so supplied that a height of the cavity-forming material is lower than a thickness of thickest portions of the first and second discharge electrodes at the ends thereof. This ensures that the height of the resulting cavity is lower than the thickness of the ends of the first and second discharge electrodes.

In yet another particular aspect of the method for producing an ESD protection device according to the present invention, forming the first and second discharge electrodes further includes, before forming the first and second discharge electrodes or after forming the first and second discharge electrodes, forming a discharge aid portion reaching the first and second discharge electrodes, a metallic material and a semiconductor material dispersed in the discharge aid portion. This leads to a reduced discharge start voltage as a result of the discharge aid portion being formed.

In still another particular aspect of the method for producing an ESD protection device according to the present invention, making the discharge aid portion on the ceramic greensheet includes forming a sealing layer on the ceramic greensheet and forming the discharge aid portion on the sealing layer. This protects the discharge aid portion and other elements from being eroded and slows down damage to the insulation between the first and second discharge electrodes because the sealing layer keeps the inside of the cavity free of the glass component and other foreign substances contained in the material for the insulating substrate.

Advantageous Effects of Invention

An ESD protection device according to the present invention, in which the first and second discharge electrodes are thicker at the ends thereof than in any other portion, is advantageous in that the gap expansion due to the melting of the ends of the first and second discharge electrodes is suppressed even if a discharge repeatedly occurs. The discharge start voltage is prevented from increasing and the durability of the ESD protection device under repeated use is improved. Furthermore, the ends of the first and second discharge electrodes are unlikely to be scorched or destroyed even after repeated application of an electrostatic charge and repeated discharges.

A method for producing an ESD protection device according to the present invention makes it possible to provide an ESD protection device according to the present invention using known techniques for co-firing ceramic articles.

DESCRIPTION OF EMBODIMENTS

The following describes some specific embodiments of the present invention with reference to the drawings to make the present invention more clearly understood.

Figure 1:
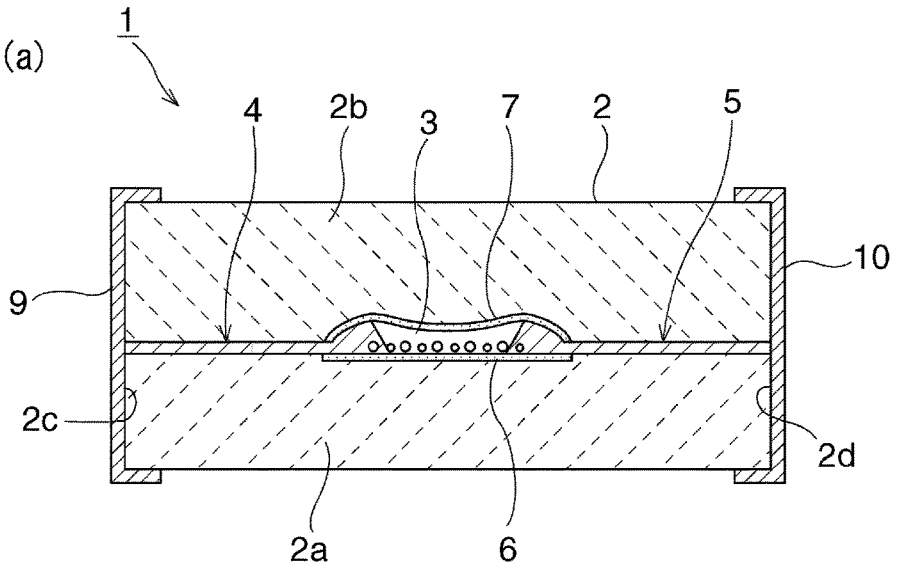
FIGS. 1 (a) and 1 (b) are a front cross-sectional view of an ESD protection device according to an embodiment of the present invention and an enlarged partially cutaway front cross-sectional view of the essential elements thereof.
Figure 1:
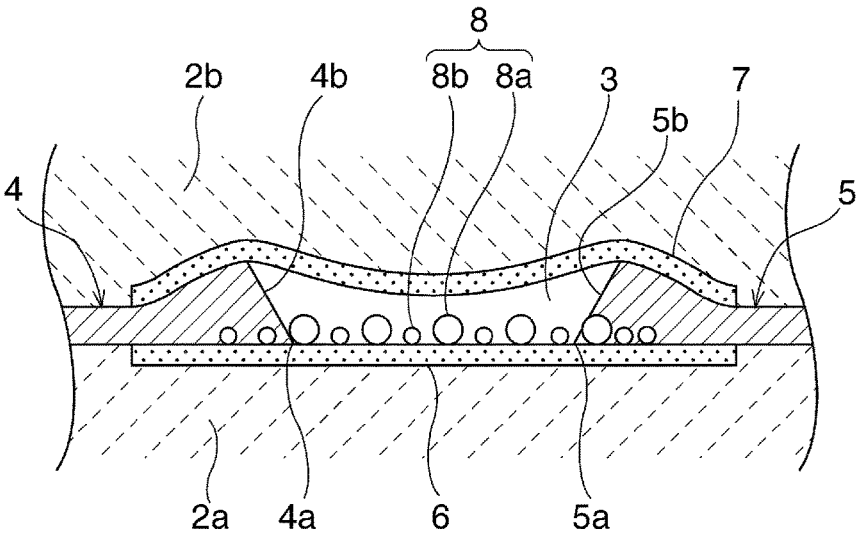

FIGS. 1 (a) and (b) are a front cross-sectional view of an ESD protection device according to Embodiment 1 of the present invention and an enlarged partially cutaway front cross-sectional view of the essential elements thereof. An ESD protection device 1 has an insulating substrate 2. In this embodiment, the insulating substrate 2 is a ceramic multilayer substrate obtained by co-firing a stack of a plurality of ceramic greensheets.

The insulating substrate 2 can be made of any suitable insulating ceramic material. In this embodiment, a Ba—Al—Si—O low-temperature co-fired ceramic (LTCC) substrate is used.

The insulating substrate 2 has substrate layers 2a and 2b. A cavity 3 is on the substrate layer 2a. First and second discharge electrodes 4 and 5 are also on the substrate layer 2a, bordering the cavity 3. The ends 4a and 5a of the first and second discharge electrodes 4 face each other in the cavity 3 with a gap therebetween. The gap between the discharge electrodes 4 and 5 is preferably from 20 to 50 μm.

This embodiment is characterized in that the first and second discharge electrodes 4 and 5 are thicker in the portions including the ends 4a and 5a than in any other portion. More specifically, the portions of the discharge electrodes from the ends 4a and 5a to the ends of the portions contained in the cavity 3 are thicker than any other portion of the discharge electrodes. When the portions excluding the ends 4a and 5a are from 5 to 25 μm thick, the portions including the ends 4a and 5a are preferably from 10 to 50 μm thick. The thick end portions of the discharge electrodes 4 and 5 may have any length in the range of 5 to 50 μm from the ends of the discharge electrodes 4 and 5. The thick end portions of the discharge electrodes 4 and 5 are in contact with a discharge aid portion 8.

Making the end portions of the discharge electrodes thicker than any other portion leads to the gap expansion associated with repeated discharges being slowed down as described later herein.

The discharge electrodes 4 and 5 can be made of any suitable metal such as Cu, Ag, Pd, Al, or Ni or any suitable alloy.

In this embodiment, a lower sealing layer 6 is on the substrate layer 2a. There is also an upper sealing layer 7 covering the ceiling of the cavity 3. The lower sealing layer 6 and the upper sealing layer 7 are made of a ceramic material having a sintering temperature higher than that of the ceramic material for the insulating substrate 2. In this embodiment, the lower sealing layer 6 and the upper sealing layer 7 are made of $Al_2O_3$. The lower sealing layer 6 and the upper sealing layer 7 keep the inside of the cavity 3 free of the glass component in the ceramic greensheets forming the insulating substrate 2. A glass component penetrating into the cavity 3 erodes the discharge aid portion, described later herein, and insulating materials including ceramic particles dispersed in the discharge aid portion, which may damage the insulation between the first and second discharge electrodes 4 and 5. The edge of the cavity 3 can be securely sealed by providing the lower sealing layer 6 and the upper sealing layer 7. However, it is also possible to omit the lower sealing layer 6 and the upper sealing layer 7.

A discharge aid portion 8 is on the lower sealing layer 6. As illustrated in FIG. 1 (b), the discharge aid portion 8 contains metal particles 8a coated with an insulating powder and semiconductor ceramic particles 8b.

The discharge aid portion 8, containing the metal particles 8a and the semiconductor ceramic particles 8b, reduces the voltage at which a discharge occurs between the first and second discharge electrodes 4 and 5.

The insulating powder can be a powder of any suitable organic material such as $Al_2O_3$. The metal particles themselves can be made of any suitable metal such as Cu or Ni or any suitable alloy.

Examples of semiconductor ceramic materials that can be used to make the semiconductor ceramic particles 8b include carbides such as titanium carbide, zirconium carbide, molybdenum carbide, and tungsten carbide, nitrides such as titanium nitride, zirconium nitride, chromium nitride, vanadium nitride, and tantalum nitride, silicides such as titanium silicide, zirconium silicide, tungsten silicide, molybdenum silicide, and chromium silicide, borides such as titanium boride, zirconium boride, chromium boride, lanthanum boride, molybdenum boride, and tungsten boride, and oxides such as zinc oxide and strontium titanate. Silicon carbide is particularly preferred because of the relative affordability and the availability of particles in various particle diameters.

Only one or a combination of two or more of such semiconductor ceramics may be used. It is also possible to blend the semiconductor ceramic particles 8b with an insulating ceramic material such as alumina before use, if necessary.

The discharge aid portion, in which the metal particles 8a coated with an inorganic insulating powder and the semiconductor ceramic particles 8b are dispersed, allows a surface discharge to occur between the end 4a of the first discharge electrode 4 and the end 5a of the second discharge electrode 5 easily, thereby reducing the discharge start voltage. As a result, the device becomes able to provide more effective protection against static electricity.

Although in FIGS. 1 (a) and (b) the discharge aid portion is partially within the bottom of the discharge electrodes 4 and 5, the discharge aid portion may be confined to the gap portion between the ends of the first and second discharge electrodes 4 and 5. It is also possible to omit the discharge aid portion.

First and second outer electrodes 9 and 10 are on the end faces 2c and 2d of the insulating substrate 2, respectively. The outer electrodes 9 and 10 can be formed by any suitable method such as applying and baking an electroconductive paste. Furthermore, the metallic material for the outer electrodes 9 and 10 may be of any kind; any suitable material such as Ag, Cu, Pd, Al, or Ni or an alloy of such metals can be used.

The ESD protection device 1 according to this embodiment is characterized in that the end portions of the first and second discharge electrodes 4 and 5 are thicker than the other portions, or the portions excluding the end portions, of the discharge electrodes and that the height H of the lowest portion of the cavity 3 is lower than the thickest portions of the first and second discharge electrodes 4 and 5. This configuration has the following advantages.

First, making the first and second discharge electrodes 4 and 5 thicker near the ends 4a and 5a thereof than in any other portion leads to the improvement of the durability under repeated use mentioned above. The background is the following: An applied electrostatic charge causes an electric discharge to occur between the end 4a of the first discharge electrode 4 and the end 5a of the second discharge electrode 5. While an electrostatic charge is repeatedly applied, the ends 4a and 5a of the first and second discharge electrodes 4 and 5, in particular, the end of the discharge electrode connected to the pole which collides with electrons, are heated and the end portions of the discharge electrodes are melted or scorched. As a result, the length of the gap between the end 4a of the first and second discharge electrodes 4 and the end 5a of the second discharge electrode 5 becomes larger. The increased length of the gap leads to an increased discharge start voltage, thereby making the device no longer reliable in protecting articles such as electronic devices from static electricity.

Compared to this one, the ESD protection device 1, in which the first and second discharge electrodes 4 and 5 are thicker in the portions including the ends 4a and 5a thereof than in any other portion, experiences only a small increase in the size of the gap G even if repeated discharges cause the discharge electrodes to be partially melted.

The ESD protection device 1 according to this embodiment is also characterized in that end faces 4b and 5b of the portions of the first and second discharge electrodes 4 and 5 including the ends 4a and 5a are straight in a front cross-sectional view. In other words, the end faces 4b and 5b, which are the surfaces of the leading ends, have a straight shape when viewed from a cross-section including the direction where the ends 4a and 5a of the first and second discharge electrodes 4 and 5 face each other and the direction of the thickness of the first and second discharge electrodes 4 and 5. This reduces variations in the size of the gap G and, therefore, reduces variations in the discharge start electrodes.

The discharges occurring in the ESD protection device 1 according to this embodiment include aerial discharges in the cavity 3 in addition to surface discharges. The ceiling of the cavity 3 has the lowest portion, i.e., the cavity 3 has the lowest height somewhere in the region between the end 4a of the discharge electrode 4 and the end 5a of the discharge electrode 5. This lowest portion of the cavity is smaller than the thickness of the thickest portions of the thick end portions of the discharge electrodes 4 and 5. Reducing the height of the cavity makes aerial discharges more likely to occur, thereby reducing the discharge start voltage. As a result, the device becomes able to provide more reliable protection against static electricity.

The discharge aid portion 8 also reduces the discharge start voltage, thereby reducing the discharge start voltage, and contributes to the improvement of the reliability of the device in protection against static electricity.

Furthermore, as described above, the lower sealing layer 6 and the upper sealing layer 7 slow down damage to the insulation between the first and second discharge electrodes 4 and 5.

The following describes an example of a method for producing the ESD protection device 1. The production of the ESD protection device 1 begins with preparing a plurality of ceramic greensheets. A ceramic paste for forming the lower sealing layer 6 is then applied to one of these ceramic greensheets. After the applied ceramic paste is dried, a composite paste for forming the discharge aid portion 8 is applied. This composite paste can be of any kind that contains the metal particles 8a, the semiconductor ceramic particles 8b, a binder resin, and a solvent. The base ceramic particles can be of the same kind as those used to make the insulating substrate 2 or any other suitable insulating ceramic powder.

After the applied composite paste is dried, the first and second discharge electrodes 4 and 5 are formed. The first and second discharge electrodes 4 and 5 can be formed by printing an electroconductive paste or the transfer technique. An electroconductive paste can be printed by any method including screen-printing the electroconductive paste and repeating the screen-printing process only within the areas corresponding to the ends of the discharge electrodes 4 and 5 to be produced so that the end portions are thicker than any other portion. The shape of the end portions can be made straight in a front cross-sectional view or rounded in the thickness direction by such means as adjusting the precision in printing the pattern, changing the solvent in the paste for the discharge electrodes, or regulating the temperatures at which the pastes are dried.

The transfer technique allows the first and second discharge electrodes 4 and 5 to be produced with the end faces 4b and 5b flat. A more specific description is the following: When the first and second discharge electrodes 4 and 5 form a projection, a resin paste is held and cured on a supporting sheet (not illustrated) to form a depression fitting with the projection. An electroconductive paste is then printed and dried on the film within the area not covered by the layer of the cured resin paste. The layer of the curd resin paste is then removed by any suitable method such as removing the layer using a solvent. The layer of the dried electroconductive paste on the supporting film is then transferred to a ceramic greensheet. In this way, the first and second discharge electrodes 4 and 5 can be formed on a ceramic greensheet. A transfer process with high precision in the formation of the end faces of the layer of the cured resin paste will ensure high precision in producing end faces vary flat and straight in a front cross-sectional view like the end faces 4b and 5b in FIG. 1 (b).

A resin paste for forming the cavity is then printed in the area where the ends of the first and second discharge electrodes 4 and 5 face each other. Then, a ceramic paste for forming the upper sealing layer 7 is applied. It is also possible to apply the resin paste for forming the cavity before forming the first and second discharge electrodes 4 and 5.

As mentioned above, the height of the cavity 3 of the ESD protection device 1 according to this embodiment is lower in the middle of the gap than in any other area. Such a configuration can be achieved by applying the resin paste for forming the cavity in a thin layer, i.e., applying the resin paste in a layer thinner than the thickness of the first and second discharge electrodes 4 and 5 near the ends 4a and 5a thereof. This ensures the volume of the cavity 3 is small; the cavity 3 is formed by the gas generated when the resin paste and the binder contained in the ceramic greensheets are vaporized. Furthermore, the laminate, mentioned above, is compressed in the thickness direction while being prepared; the upper ceramic greensheets are deformed to be convex toward the resin paste for forming the cavity, which is thicker than the layers therearound, i.e., convex downward. The cavity 3 can thus be easily formed by firing with the height of the ceiling lower in the middle portion than in any other portion as in the drawings. It is also possible to form the cavity portion without applying a resin paste. If no resin paste is applied, however, the ceramic greensheet above the cavity portion may adhere to the one below the cavity portion when deformed to be convex downward, affecting the consistency of the process of forming the cavity portion. Thus, the cavity portion may also be formed with a resin paste applied only in the middle portion of the area where the cavity portion is to be formed. This allows a low cavity to be produced with higher consistency.

Although in the production process described above the resin paste for forming the cavity 3 is supplied after 4 and 5 are formed with the discharge aid portion and the first and second discharges, it is possible to supply the resin paste before forming the first and second discharge electrodes 4 and 5.

The first and second outer electrodes 9 and 10 can be formed by first finishing the insulating substrate 2 by firing and then applying an electroconductive paste to the end faces of the insulating substrate 2 and baking the applied paste. It is also possible to apply an electroconductive paste after preparing the laminate and then bake the applied electroconductive paste to complete the outer electrodes 9 and 10 while firing the laminate to obtain the insulating substrate 2.

The resin paste for forming the cavity 3 can be one containing a suitable resin that is vaporized and generates a gas at a temperature at which the insulating substrate 2 is fired. Examples of such resins include suitable synthetic resins such as polypropylene, ethyl cellulose, and acrylic resins.

Plain ceramic greensheets are then placed on and under the one on which the first and second discharge electrodes and other elements have been deposited in the way described above. The stack of the ceramic greensheets is compressed in the thickness direction, whereby the laminate is obtained.

An electroconductive paste is applied to both end faces of this laminate. The laminate is then fired, whereby the ESD protection device 1 according to this embodiment is obtained.

It is also possible to form the outer electrodes after the insulating substrate 2 is obtained by firing.

Figure 2:
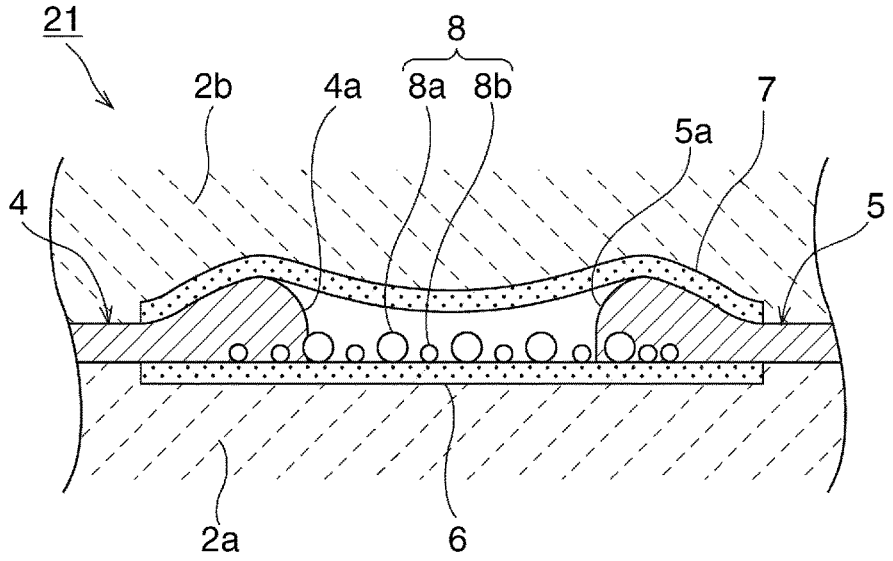
FIG. 2 is a partially cutaway front cross-sectional view of the essential elements of an ESD protection device according to Embodiment 2 of the present invention.

FIG. 2 is a partially cutaway front cross-sectional view of the essential elements of an ESD protection device 21 according to Embodiment 2. The ESD protection device 21 according to Embodiment 2 is similar to the ESD protection device 1 according to Embodiment 1 except that the ends 4a and 5a of the first and second discharge electrodes 4 and 5 are rounded. The elements described in Embodiment 1 are not described again, with like reference numerals referring to like elements.

As in the ESD protection device 21 according to Embodiment 2, the end 4a of the first discharge electrode 4 and the end 5a of the second discharge electrode 5 may be rounded. This configuration also ensures that the expansion of the discharge gap is suppressed in a reliable manner even if a discharge repeatedly occurs because the first and second discharge electrodes 4 and 5 are thicker in the end portions thereof than in any other portion.

Furthermore, the ESD protection device 21 is as in Embodiment 1 except in the above regard; in other regards, this device has the same operational advantages as those of the ESD protection device 1 according to Embodiment 1.

Figure 3:
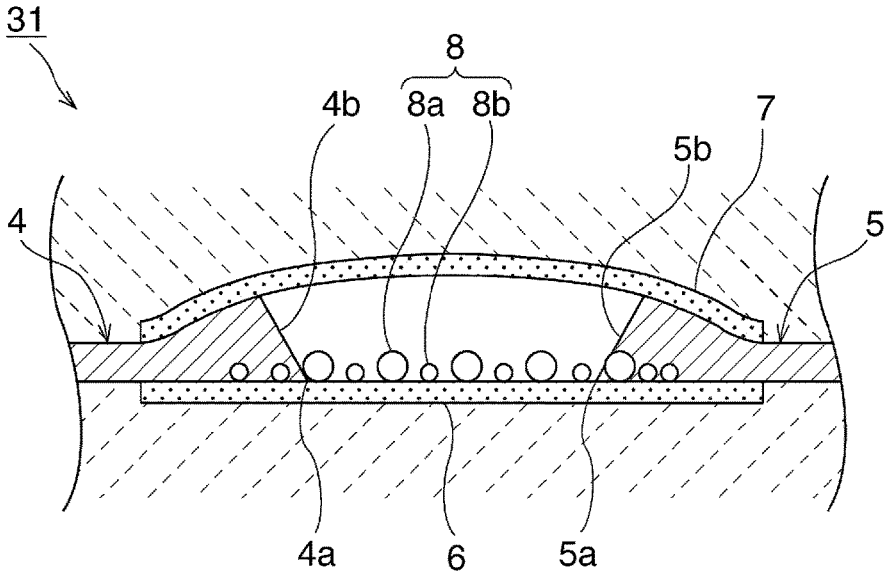
FIG. 3 is a partially cutaway front cross-sectional view of the essential elements of an ESD protection device according to Embodiment 3 of the present invention.

FIG. 3 is a partially cutaway front cross-sectional view of the essential elements of an ESD protection device 31 according to Embodiment 3 of the present invention. The ESD protection device 31 according to Embodiment 3 is characterized in that the shape of the cavity 3 bulges upward like a dome in a front cross-sectional view as in the drawing. In other regards, the ESD protection device 31 is equivalent to the ESD protection device 1.

As in this configuration, the top face of the cavity 3 may be convex upward like a dome. The cavity 3 can be formed by supplying a resin paste, a material for forming the cavity, and vaporizing the supplied paste while firing the ceramics.

The cavity 3 is produced not only by the gas of the resin paste but also by those generated by processes such as the binder resin in the ceramic greensheets turning into a gas. The resulting cavity 3 is thus usually larger in volume than the cavity-forming material applied beforehand and convex upward as in FIG. 3. This configuration also ensures improved durability of the ESD protection device under repeated use and reduced variations in discharge start voltage because the first and second discharge electrodes 4 and 5 are thicker in the ends 4a and 5a than in any other portion with the end faces 4b and 5b very flat.

However, Embodiments 1 and 2 are preferred as compared to Embodiment 3 because in these two embodiments, as mentioned above, the lowest portion of the cavity 3 is lower than the height of the cavity at the thickest portions of the discharge electrodes 4 and 5 at the ends thereof and thus an aerial discharge is more likely to occur than in the other.

In other regards, the ESD protection device 31 according to Embodiment 3 is as in Embodiment 1 and thus has the same operational advantages as those of the ESD protection device 1 according to Embodiment 1.

Figure 4:
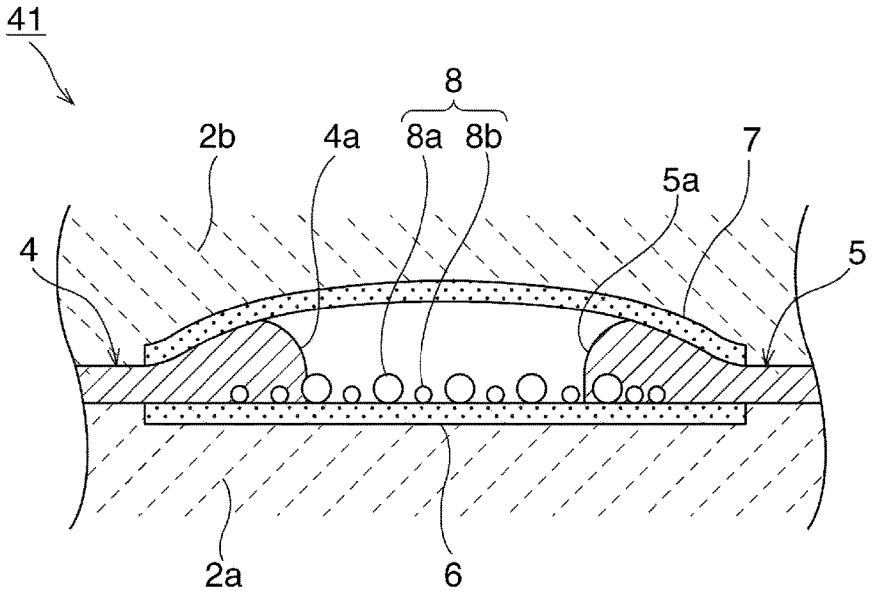
FIG. 4 is a partially cutaway front cross-sectional view of the essential elements of an ESD protection device according to Embodiment 4 of the present invention.

FIG. 4 is a partially cutaway front cross-sectional view of an ESD protection device 41 according to Embodiment 4 of the present invention. The ESD protection device 41 according to Embodiment 4 is similar to the ESD protection device 21 in that the ends 4a and 5a of the first and second discharge electrodes 4 and 5 are rounded in a front cross-sectional view, and is also similar to the ESD protection device 31 in that the ceiling of the cavity 3 is like a dome. As in this configuration, it is possible in the present invention that the ends of the first and second discharge electrodes 4 and 5 are rounded in a front cross-sectional view and that the structure of the cavity 3 is convex upward like a dome. This device is also equivalent to the ESD protection device 1 according to Embodiment 1 in other regards; the device offers improved durability under repeated use for protection against static electricity and has the same operational advantages as those of the ESD protection device 1 according to Embodiment 1.

The following describes some specific examples of experiments.

Example 1

A Ba—Al—Si—O ceramic composition was prepared and calcined at 700 to 900° C. The calcined powder was pulverized, whereby a raw material ceramic powder was obtained. This raw material ceramic powder was mixed with a mixture of toluene and EKINEN, and a resin binder and a plasticizer were added to form a ceramic slurry. The ceramic slurry was formed by the doctor blade method into ceramic greensheets with a thickness of 50 μm. In this way, a plurality of 50-μm thick ceramic greensheets were prepared.

A ceramic paste for forming a sealing layer 6 was printed on one of the ceramic greensheets in a thickness of 10 μm, and the printed paste was dried. The ceramic paste contained $Al_2O_3$.

After the printed ceramic paste was dried, a composite paste for forming a discharge aid portion 8 was applied and dried. This composite paste was prepared in the following way: a Cu powder having an average particle diameter of 2 μm was coated with an $Al_2O_3$ powder having an average particle diameter of several nanometers to several tens of nanometers, the obtained metal particles 8a and silicon carbide particles having an average particle diameter of 1 μm were taken in specified relative amounts, and a binder resin and a solvent were added. The composite paste was so prepared that the total quantity of the binder resin and the solvent was 20% by weight of the paste and the balance consisted of the metal particles 8a and the semiconductor ceramic particles 8b.

The electroconductive paste for forming first and second discharge electrodes 4 and 5 was obtained by mixing a solid containing 80% by weight of a Cu powder having an average particle diameter of 2 μm and 20% by weight of ethyl cellulose, a binder resin, with a solvent. This electroconductive paste was screen-printed. More specifically, a layer of 15 μm thick was first formed by screen printing, and then the screen-printing process was repeated within the areas corresponding to the ends of the first and second discharge electrodes 4 and 5 to be produced until the thickness of the end portions reached 40 μm.

A resin paste was then applied between the first and second discharge electrodes 4 and 5 in a thickness of 5 μm. This resin paste was obtained by kneading an acrylic resin with a solvent.

A ceramic paste for forming a sealing layer 6 covering the end portions of the first and second discharge electrodes 4 and 5 and the applied resin paste was then printed in a thickness of 10 μm, and the printed paste was dried.

Plain ceramic greensheets were placed on and under the above one, with more than one stacked on each side, and the stack of the ceramic greensheets was compressed in the thickness direction, whereby a laminate was obtained. A Cu paste for forming outer electrodes 9 and 10 was applied to both end faces of this laminate. The laminate was then fired, whereby an ESD protection device 1 was obtained.

The distance between the first and second discharge electrodes 4 and 5, i.e., the gap length, of the ESD protection device 1 after firing was 30 μm.

The thickness of the first and second discharge electrodes 4 and 5 after firing was 30 μm in the thickest portions on the leading end side and 10 μm in the other portions, i.e., the portions excluding the ends. The height of the lowest portion of the resulting cavity 3 was 10 μm.

Example 2

An ESD protection device 21 according to Embodiment 2 was fabricated. The first and second discharge electrodes 4 and 5 were formed as in Example 1, by printing an electroconductive paste several times; however, the precision in printing the pattern was changed so that the ends of the first and second discharge electrodes 4 and 5 were rounded.

The length of the gap between the ends of the first and second discharge electrodes 4 and 5 was 30 μm. The thickness of the thickest portions of the first and second discharge electrodes 4 and 5 was 30 μm. The height of the lowest portion of the cavity 3 was 10 μm.

Example 3

An ESD protection device 31 according to Embodiment 3, illustrated in FIG. 3 was formed. The process was as in Example 1 except that the resin paste for forming the cavity 3 was applied in a thickness of 20 μm. As a result, the cavity 3 was formed with the ceiling thereof convex upward, or like a dome, as illustrated in FIG. 3. The distance of the gap between the first and second discharge electrodes was 30 μm. The thickness of the thickest portions of the first and second discharge electrodes was 30 μm. The height of the portion of the cavity 3 in the middle where the ceiling is the highest was 35 μm.

Example 4

The process was as in Example 1 except that the first and second discharge electrodes were formed as in Example 2 and the resin paste for forming the cavity was supplied as in Example 3.

The length of the gap between the first and second discharge electrodes was 30 μm. The thickness of the thickest portions of the first and second discharge electrodes on the leading end side was 30 μm. The height of the cavity 3, the height in the middle portion, was 35 μm.

Comparative Example

Figure 5:
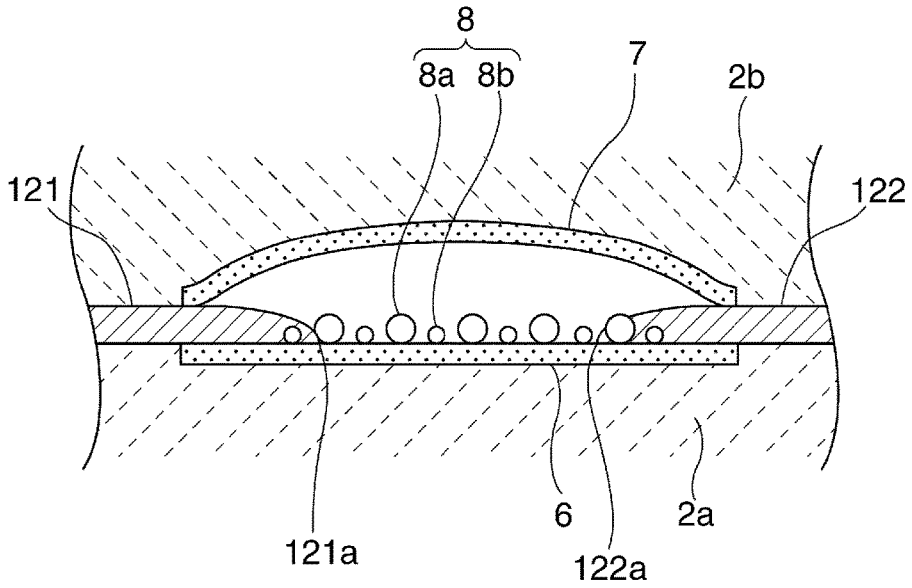
FIG. 5 is a partially cutaway front cross-sectional view of the essential elements of an ESD protection device prepared as a comparative example.

An ESD protection device was fabricated as in Example 1 except that the first and second discharge electrodes were formed by printing an electroconductive paste only once; although a cavity 3 is between two substrate layers 2a and 2b, the first and second discharge electrodes 121 and 122 are thinner near the ends 121a and 122a thereof than in any other portion as illustrated in FIG. 5. More specifically, the first and second discharge electrodes 121 and 122 become thinner toward the ends 121a and 122a. The cavity 3 had a shape convex upward in the middle like a dome.

The length of the gap between the first and second discharge electrodes 121 and 122 was 30 μm. The height of the portion of the cavity 3 in the middle where the ceiling is the highest was 20 μm. The thickness of the thickest portions of the first and second discharge electrodes 121 and 122, the thickness of the portions not located near the ends 121a and 122a, was 10 μm.

These ESD protection devices according to Examples 1 to 4 and Comparative Example were evaluated for (1) response to ESD and (2) durability under repeated ESD.

(1) Response to ESD

Electrostatic discharge immunity tests were performed to evaluate the response to ESD in accordance with the IEC standard IEC 61000-4-2. The specimens were observed for the occurrence of a discharge between the discharge electrodes while a voltage of 8 kV was applied thereto by contact discharge. The devices were assessed as having poor discharge response (x) if the peak voltage detected at the protection circuit exceeded 600 V, having good discharge response (○) if that peak voltage was in the range of 450 to 600 V, and having excellent discharge response (⊙) if that peak voltage was less than 450 V.

(2) Durability Under Repeated ESD

The specimens were assessed for response to ESD in the way described above after different voltages were repeatedly applied thereto by contact discharge as follows: 20 times at 2 kV, 20 times at 3 kV, 20 times at 4 kV, 20 times at 6 kV, and 20 times at 8 kV. The devices were assessed as having poor durability under repeated ESD (x) if the peak voltage detected at the protection circuit exceeded 600 V, having good durability under repeated ESD (○) if that peak voltage was in the range of 450 to 600 V, and having excellent durability under repeated ESD (⊙) if that peak voltage was less than 450 V.

The results are summarized in Table 1 below.

TABLE 1

| | Response to ESD | Durability under repeated ESD |
|---|---|---|
| Example 1 | ⊙ | ⊙ |
| Example 2 | ⊙ | ⊙ |
| Example 3 | ○ | ○ |
| Example 4 | ○ | ○ |
| Comparative Example | ○ | X |

As is clear from Table 1, the ESD protection device of Comparative Example was poor in durability under repeated ESD, whereas those of Examples 1 to 4 were superior in durability under repeated ESD. In particular, Examples 1 and 2, in which the height in the middle of the cavity was lower than in the others, exhibited even better durability under repeated ESD than Examples 3 and 4, presumably because aerial discharges were likely to occur. Likewise, Examples 1 and 2 exhibited better response to ESD than Examples 3 and 4 and Comparative Example, presumably because aerial discharges were likely to occur.

Then, sets of 30 ESD protection devices were fabricated in accordance with Comparative Example of Examples 1 to 4 and subjected to the measurement of discharge start voltage. The variations in discharge start voltage as expressed by [a] σ were not more than 40 for Examples 1 and 3. The value [a] σ was more than 40 and not more than 60 for Examples 2 and 4, and [a] σ was more than 70 and not more than 80 for Comparative Example. The variations in discharge start voltage were therefore smaller in Examples 1 and 3, in which the end faces 4b and 5b of the first and second discharge electrodes were flat.

REFERENCE SIGNS LIST

1 . . . ESD protection device
2 . . . Insulating substrate
2a, 2b . . . Substrate layers
2c, 2d . . . End faces
3 . . . Cavity
4, 5 . . . First and second discharge electrodes
4a, 5a . . . Ends
4b, 5b . . . End faces
6 . . . Lower sealing layer
7 . . . Upper sealing layer
8 . . . Discharge aid portion
8a . . . Metal particles
8b . . . Semiconductor ceramic particles
9, 10 . . . First and second outer electrodes
21 . . . ESD protection device
31 . . . ESD protection device
41 . . . ESD protection device
121, 122 . . . First and second discharge electrodes
121a, 122a . . . Ends

The invention claimed is:

1. An ESD protection device comprising:

an insulating substrate having a cavity therein;

first and second discharge electrodes disposed in the cavity of the insulating substrate, ends of the first and second discharge electrodes facing each other with a gap therebetween;

a first outer electrode on an outer surface of the insulating substrate, the first outer electrode being electrically connected to the first discharge electrode; and a second outer electrode on the outer surface of the insulating substrate, the second outer electrode being electrically connected to the second discharge electrode, wherein

*the insulating substrate includes a plurality of substrate layers that are stacked on each other in a stacking direction, and*

[each of] the [ends] *end* of the first [and second] discharge [electrodes] *electrode* is thicker *in the stacking direction of the substrate layers* than any other [portions of each] *portion* of the first [and second] discharge [electrodes] *electrode*.

2. The ESD protection device according to claim 1, wherein the insulating substrate is a ceramic multilayer substrate obtained by firing a stack of a plurality of ceramic greensheets.

3. The ESD protection device according to claim 1, wherein a height of a lowest portion of a ceiling of the cavity is shorter than a thickness of a thickest portion of [each of] the [ends] *end* of the first [and second] discharge [electrodes] *electrode* when a direction of a thickness of [each of] the first [and second] discharge [electrodes] *electrode* is defined as a direction of a height of the cavity.

4. The ESD protection device according to claim 1, wherein each of the ends of the first and second discharge electrodes has an end face that is straight when viewed from a cross-section including a direction where the ends face each other and the direction of the thickness of each of the first and second discharge electrodes.

5. The ESD protection device according to claim 1, further comprising a discharge aid portion being partially overlapped with the first and second discharge electrodes in an area where the first and second discharge electrodes face each other with the gap therebetween, the discharge aid portion containing metal particles and semiconductor particles.

6. The ESD protection device according to claim 5, further comprising a sealing layer between the discharge aid portion and the insulating substrate.

7. A method for producing an ESD protection device, comprising:

preparing a plurality of ceramic greensheets;

forming first and second discharge electrodes on at least one of the plurality of ceramic greensheets so that [each of ends] *an end* of the first [and second] discharge [electrodes] *electrode* is thicker *in a stacking direction of the plurality of ceramic greensheets* than in any other [portions] *portion* of [each of] the first [and second] discharge [electrodes] *electrode*;

placing plain ones of the plurality of ceramic greensheets on and under the at least one ceramic greensheet having the first and second discharge electrodes formed thereon to make a laminate *of the plurality of ceramic greensheets stacked in the stacking direction*;

firing the laminate to make an insulating substrate having a cavity in which the [ends] *end* of the first [and] *discharge electrode faces an end of the* second discharge [electrodes face each other] *electrode*, and forming first and second outer electrodes electrically connected to the first and second discharge electrodes, respectively.

8. The method for producing an ESD protection device according to claim 7, wherein forming the first and second discharge electrodes on the at least one ceramic greensheet further includes, before forming the first and second discharge electrodes or after forming the first and second discharge electrodes, supplying a cavity-forming material that is vaporized when fired.

9. The method for producing an ESD protection device according to claim 7, wherein the cavity-forming material is so supplied that a height of the cavity-forming material is lower than a thickness of a thickest portion of [each of] the [ends] *end* of the first [and second] discharge [electrodes] *electrode*.

10. The method for producing an ESD protection device according to claim 7, wherein forming the first and second discharge electrodes further includes, before forming the first and second discharge electrodes or after forming the first and second discharge electrodes, forming a discharge aid portion being partially overlapped with the first and second discharge electrodes on the at least one ceramic greensheet, wherein the discharge aid portion comprises a metallic material and a semiconductor material dispersed therein.

11. The method for producing an ESD protection device according to claim 10, wherein forming the discharge aid portion on the at least one ceramic greensheet includes forming a sealing layer on the at least one ceramic greensheet and forming the discharge aid portion on the sealing layer.

*12. The ESD protection device according to claim 1, wherein the end of the second discharge electrode is thicker than any other portion of the second discharge electrode.*

*13. The method for producing an ESD protection device according to claim 7, wherein an end of the second discharge electrode is thicker than in any other portion of the second discharge electrode.*

* * * * *